United States Patent [19]

Sato et al.

[11] Patent Number: 4,629,877
[45] Date of Patent: Dec. 16, 1986

[54] PHOTO-ELECTRIC CONVERSION DEVICE

[75] Inventors: Yuichi Sato; Tokuichi Tsunekawa; Takashi Kawabata; Susumu Matsumura, all of Kanagawa, Japan

[73] Assignee: Canon Kabushiki Kaisha

[21] Appl. No.: 596,268

[22] Filed: Apr. 3, 1984

[30] Foreign Application Priority Data

Apr. 4, 1983 [JP] Japan .................. 58-59601

[51] Int. Cl.⁴ ............................... G01J 1/20
[52] U.S. Cl. .......................... 250/201; 250/214 B
[58] Field of Search ............... 250/201, 214 B, 214 C, 250/214 AL

[56] References Cited
FOREIGN PATENT DOCUMENTS
52974 4/1980 Japan ........................ 250/214 B

*Primary Examiner*—Gene Wan
*Attorney, Agent, or Firm*—Toren, McGeady, Stanger, Goldberg & Kiel

[57] ABSTRACT

In the disclosed photo-electric conversion device, a light source repetitiously emits light and a photo-electric converter receives reflected light originally generated by the source and ambient light. A first store stores the output of the photo-electric converter when the light source emits light and a second store stores data from the photo-electric converter when the source does not emit light. A gate transfers the output from the converter to the first and second stores. A pulse generator controls the gate for transferring the converter output to the first store and the second store during every light emitting cycle of the light source.

5 Claims, 5 Drawing Figures

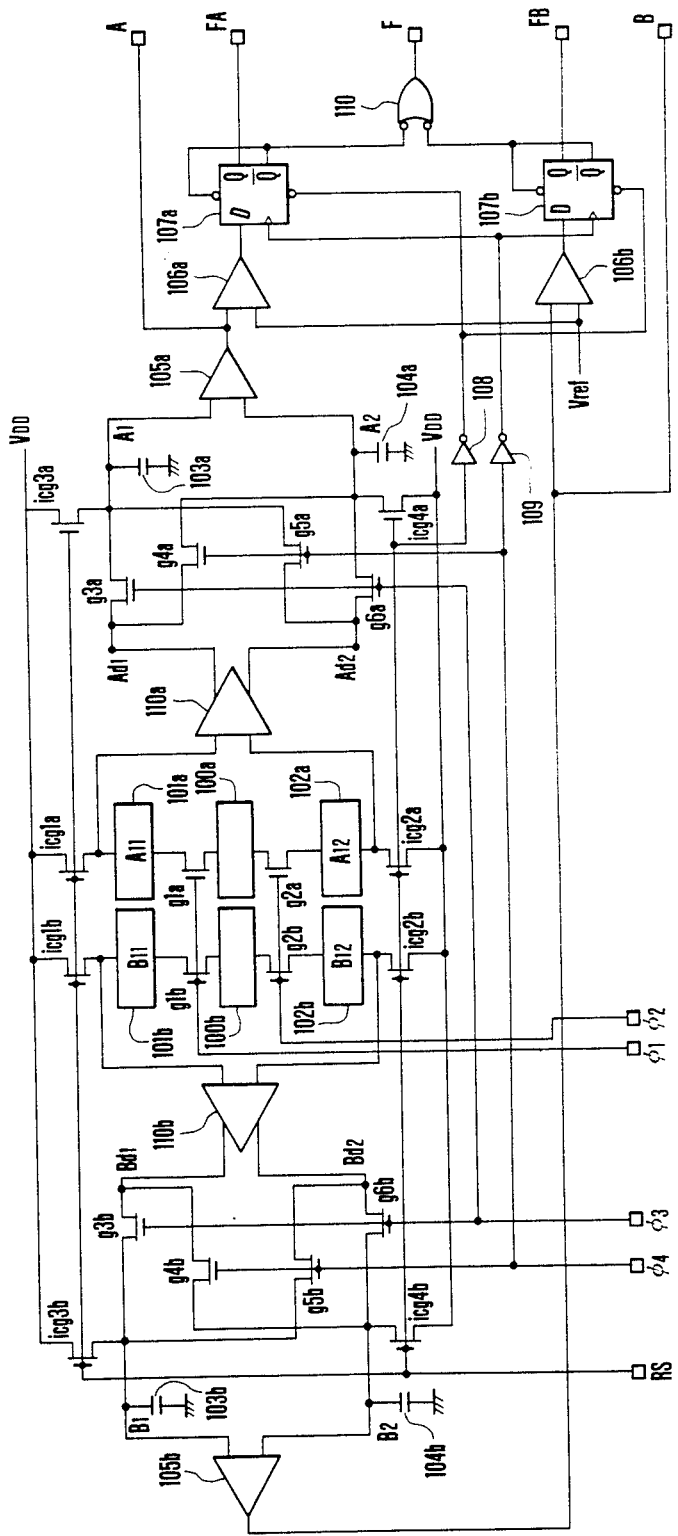
F I G. 5

PHOTO-ELECTRIC CONVERSION DEVICE

BACKGROUND OF THE INVENTION

The present invention relates to a photo-electric conversion device, and particularly to a photo-electric conversion device of a differential type which, for example, has two photo-electric conversion portions and computes a distance on the basis of signals from the photo-electric conversion portions.

DESCRIPTION OF THE PRIOR ART

An existing type of differential sensor forms a differential signal A representing the differential between an amount A1 of light received under a first condition and an amount A2 of light received under a second condition. The differential signal represented by an equation, $$A = A1 - A2 \quad (1).$$

offsets of A1 and A2 will be A1e, A2e, which will become an offset of A, that is $Ae = A1e - A2e$ and will be overlapped with A1 and A2, therefore in a system which processes fine differential signal A, Ae exercises a significant influence on an S/N ratio or a sensitivity of a sensor, thus an elimination of Ae is an important subject. For example, when a mean value $\overline{A}$ of A is about 5% of a mean value $\overline{A1}$ of A1 or a mean value $\overline{A2}$ of A2, and an offset element of A1 is about 1% of A1 or A2, Ae will become to have a magnitude of about 20% of $\overline{A}$. An elimination of an offset element may be done by subtracting Ae from A, but for that end Ae needs to be measured, necessitating an adjustment for an offset element removal, thus such process is not suited to a case where a differential type sensor which produces a differential signal A is to be constituted with ICs. Also an adjustment cost will be added for having such means built in a mass production equipment.

SUMMARY OF THE INVENTION

It is an object of the present invention to provide a differential type light receiving sensor which eliminates the above-mentioned shortcomings and at the same time which requires less space to be occupied for mounting by eliminating necessity of provision of offset eliminating means for a differential signal A at the exterior of the sensor, and is less susceptible to operational troubles by reduced points of wiring at the exterior of the sensor.

A major characterizing feature of the differential type sensor according to the present invention is realized in a light receiving sensor, which receives light reflected from objects at a photo-electric conversion part and has a charge storage part to store charge generated at the photo-electric conversion part, and lies in that the charge storage part to store charge generated at the photo-electric conversion part by the light reflected from an object at a time of light projection and the charge storage part which stores charge generated at the photo-electric conversion part at a time of no light projection is changed over every one light projection cycle period.

A further characterizing feature of the same lies in providing information storage means which stores information from the charge storage part to store charge generated at the photo-electric conversion part at the time of light projection and information from the charge storage part to store charge generated at the photo-electric conversion part at the time of no light projection, and effecting a detection of information of the information storage means after an even number of light projection cycle period.

Moreover, another characterizing feature lies in having first information storage means to store information from the charge storage part which stores charge at a time of light projection and second information storage means to store information from the charge storage means which stores charge at the time when no light projection is made.

Furthermore, an additional characterizing feature lies in having information storage means to store information on a difference between information from the charge storage part which stores charge at the time of light projection and information from the charge storage part which stores charge at the time when no light projection is made.

BRIEF DESCRIPTION OF THE DRAWINGS

FIG. 5 is a diagram of another embodiment of a position detecting sensor.

DETAILED DESCRIPTION OF THE PREFERRED EMBODIMENTS

Next, embodiments of the present invention will be explained with reference to the drawings.

Figure 1:
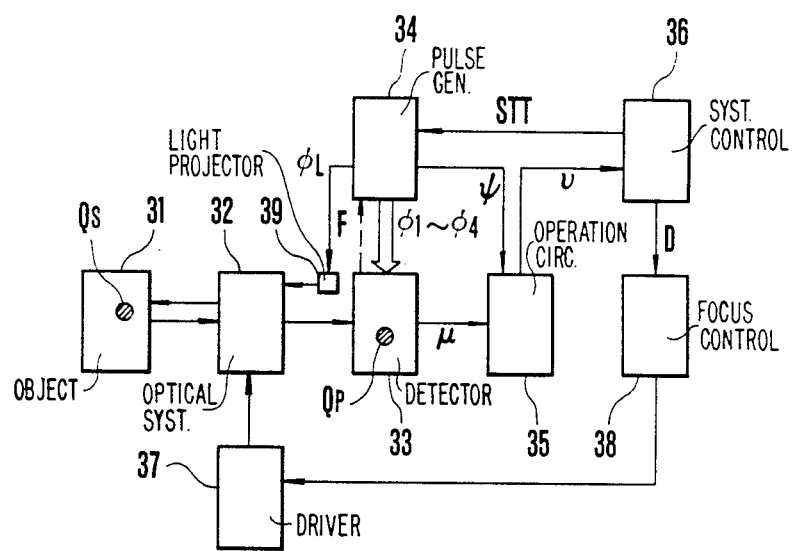
FIG. 1 and FIG. 2 are schematic diagrams of an embodiment in which a differential type light receiving sensor according to the present invention is employed at a focusing device.
Figure 2:
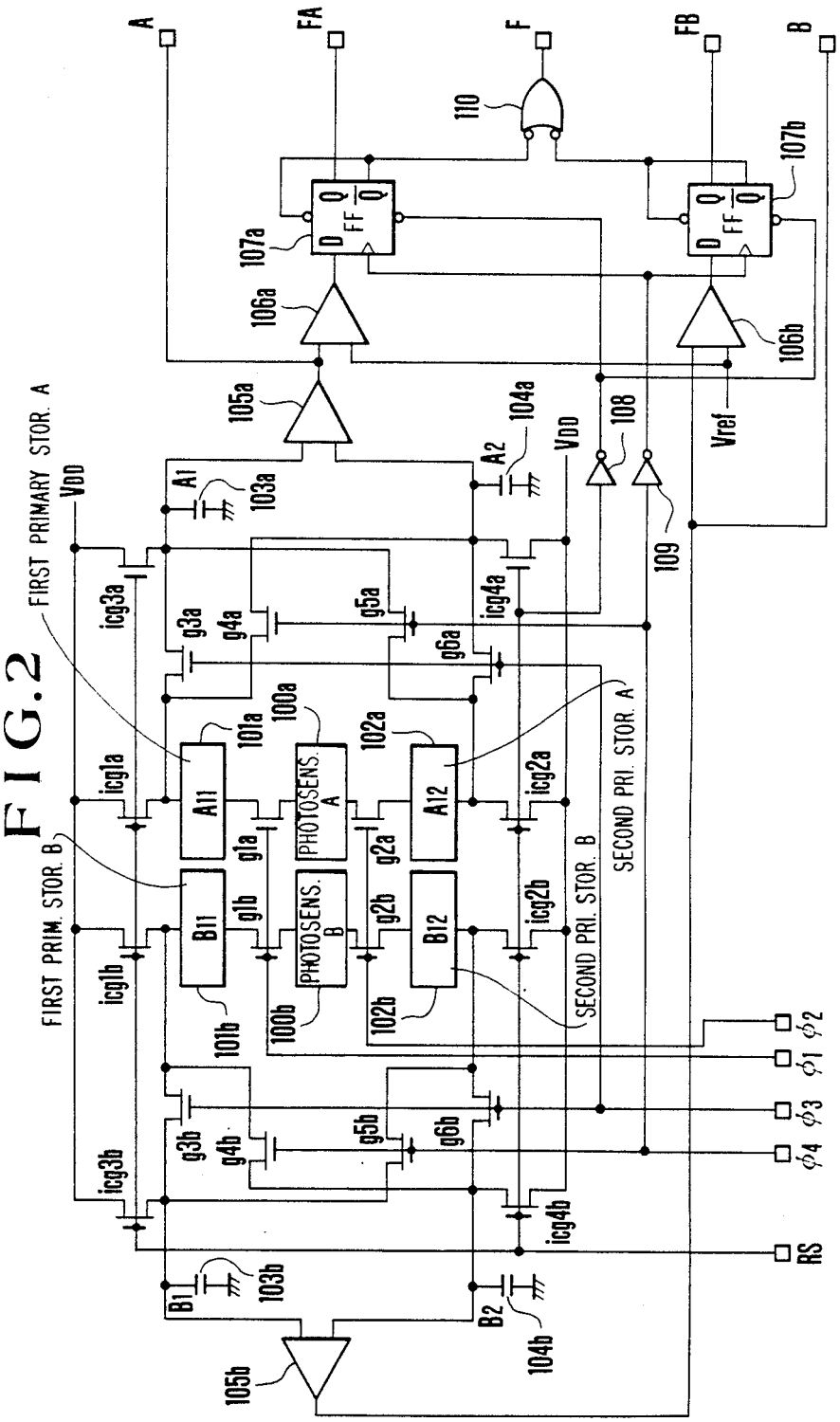
Figure 3:
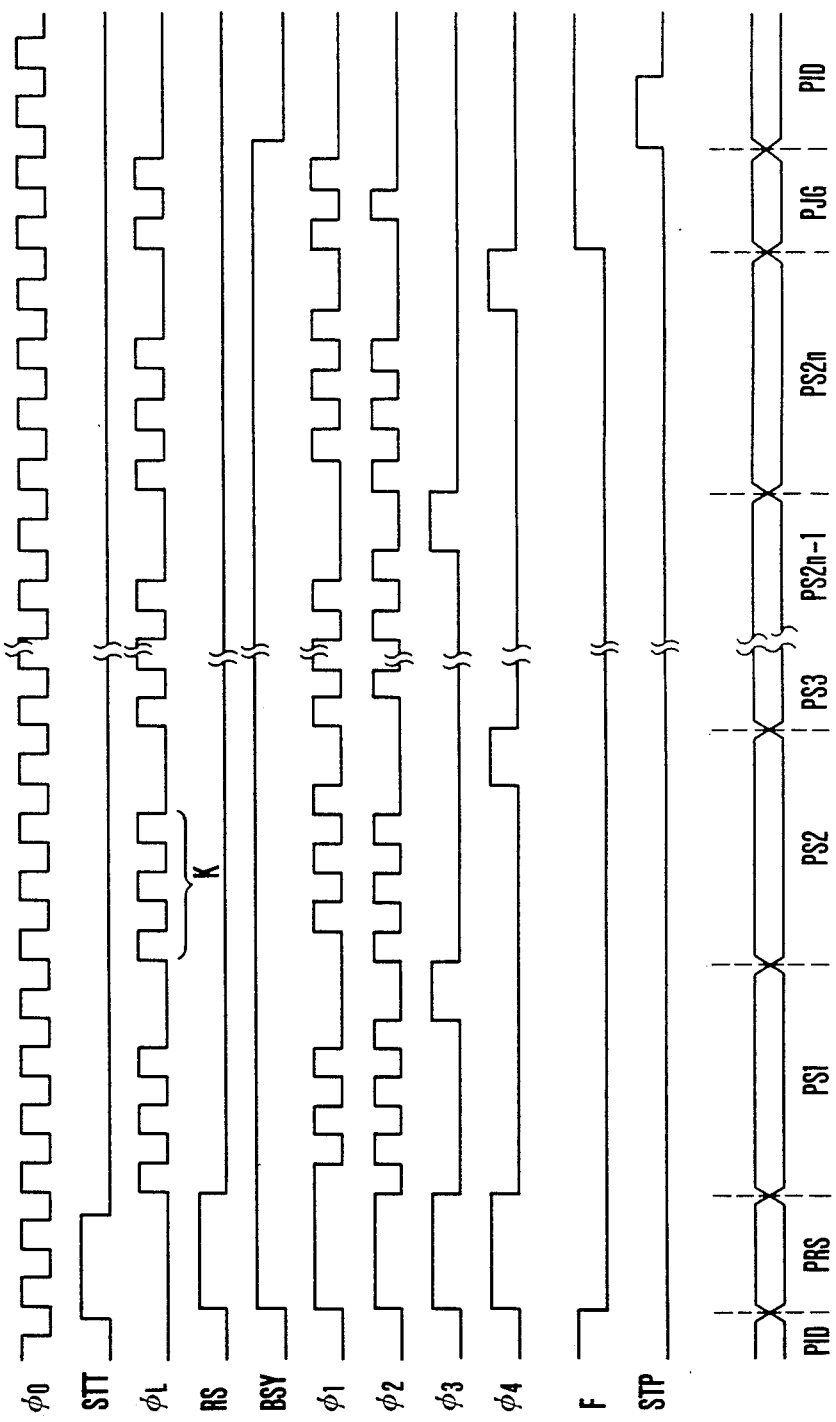
FIG. 3 is a schematic diagram for a timing chart for a case when a position detecting sensor shown in FIG. 2 is driven.
Figure 4:
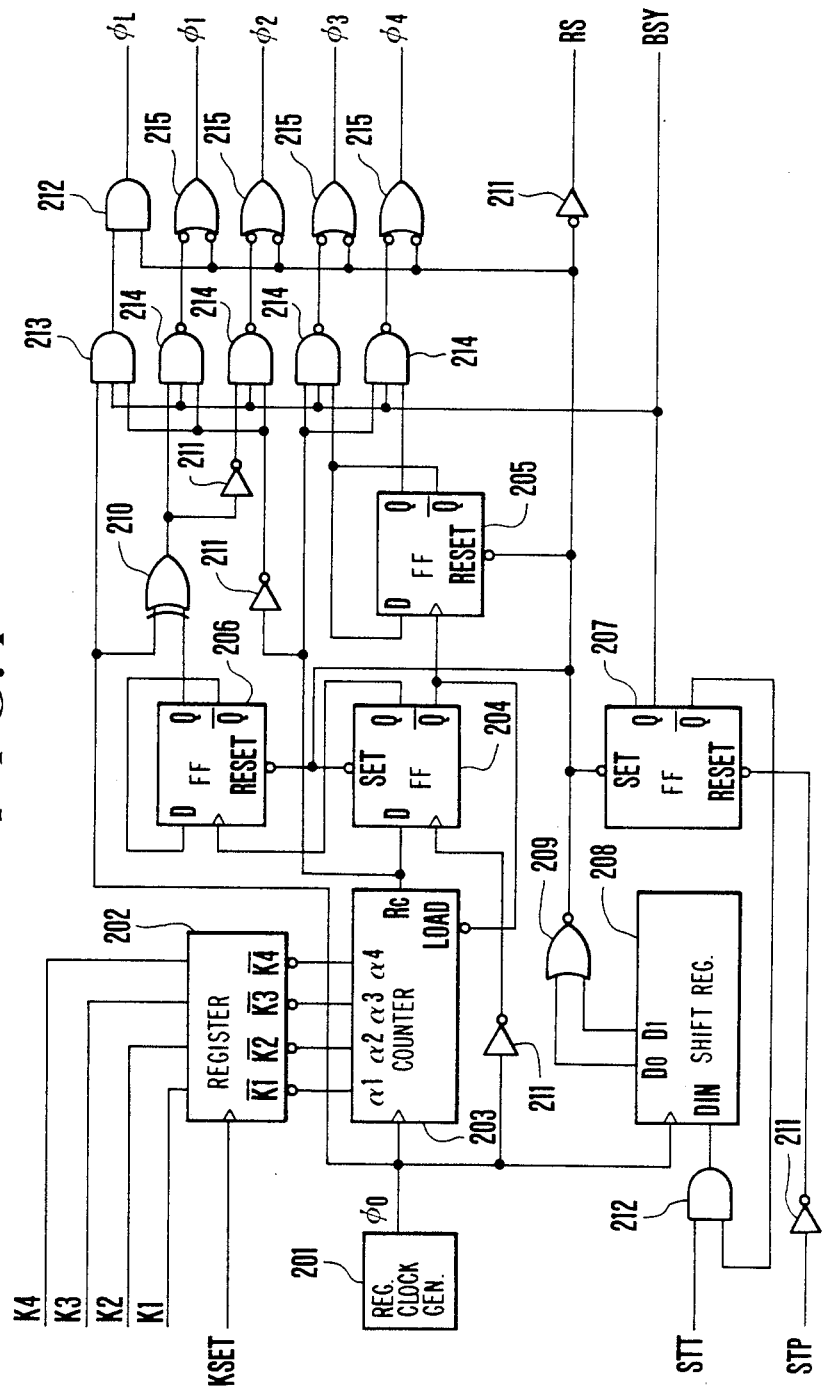
FIG. 4 is a schematic diagram of an embodiment of a timing pulse generator shown in FIG. 3.

FIG. 1 to FIG. 5 show embodiments of the present invention, wherein a differential type sensor is applied to a focusing device. FIG. 1 is an over-all diagram for a focusing device. FIG. 2 shows an embodiment of a simple position detecting sensor in which two differential type sensors are combined. FIG. 3 is a timing chart for timing pulses to drive the position detecting sensor. FIG. 4 shows an embodiment of a timing pulse generator to produce the timing pulses shown in FIG. 3. FIG. 5 shows another embodiment of a position detecting sensor. The position detecting sensors shown in FIG. 1 and FIG. 5 are sensors to detect a focusing state of an image pick-up optical system in a focusing device, and is used to detect a focusing state of the image pick-up optical system in combination with an optical system being so made that a projected image on a position sensor light receiving part of a radiant (luminous spot; bright spot) projected on an object moves on the light receiving part of the position sensor according to a focusing state of the image pick-up optical system.

Now, FIG. 1 to FIG. 5 will be explained in turn. FIG. 1 shows an embodiment of the present invention, wherein 32 is an optical system including a light projecting optical system and an image pick-up optical system, and projects a radiant image Qs, which has been projected on an object 31 from a light projecting source 39 through the optical system 32, onto a differential type position detecting sensor 33 by the optical system 32. The optical system 32 is so made that a position of a radiant image Qp projected on the position detecting sensor 33 moves according to a focusing state of an image pick-up optical system included in the optical system 32. What is shown as μ is a signal including focusing information of the image pick-up optical system produced from the position detecting sensor, and an amount of a deviation in focusing is presumed by an operation circuit 35, then a presumed value υ is sent to system control means 36. The system control means 36 sends a focusing control signal D to focusing control means 38 of the image pick-up optical system according to a magnitude of the presumed value of an amount of deviation in focusing, and the focusing control means 38 sends a driving signal depending on D to driving means 37 which is to change a focusing state of the image pick-up optical image.

When the system control means 36 gives a focusing initiation signal STT to the timing pulse generation means 34; the timing pulse generation means 34 sends out timing pulses φ1 to φ4, RS for driving the differential type position detecting sensor 33 and at the same time sends a light projection control signal φL to the light projection light source 39 to initiate a detection of a focusing state of the image pick-up optical system. When an output level of the differential type position detecting sensor 33 reaches a certain level, a signal F becomes "H", thus informing the timing pulse generation means 34 that the signal μ including a focusing state has been set. After that an amount of deviation in focusing is presumed by the operation means 35 out of the signal μ, and sends a presumed value υ to the system control means 36. The system control means 36 drives the driving means 37 with the focusing control signal D through the focusing control means 38 to change the focusing state of an image pick-up optical system included in the optical system 32. In most cases the image pick-up optical system consists of image pick-up lens or lenses, and the focusing state of a photo-taking lens is changed by changing the drive-out amount of the photo-taking lens. What is shown as ψ is the timing pulse for operating the operation circuit.

In FIG. 2, what is shown as 100a is a photo-sensitive part A, and 100b is a photo-sensitive part B, while 101a is a first primary storage part for A, and 101b is a first primary storage part for B. What is shown as 102a is a second primary storage part for A, and 102b is a second primary storage part for B, while 103a is a first secondary storage part for A, and 103b is a first secondary storage part for B. What is shown as 104a is a second secondary storage part for A, and 104b is a second secondary storage part for B, while 105a is a differential amplifier for A, and 105b is a differential amplifier for B, then 106a is a comparator for A, and 106b is a comparator for B, while 107a is a D-flip-flop for A, and 107b is a D-flip-flop for B. What are shown as g1a, g2a, g3a, g4a, g5a, g6a, g1b, g2b, g3b, g4b, g5b, g6b are gates, and icg1a, icg2a, icg3a, icg4a, icg1b, icg2b, icg3b, icg4b are integration clear gates, while VDD is a drain, and 108 is a first inverter, then 109 is a second inverter, and 110 is a logic gate. What is shown as A11 is an output of the first primary storage part for A, and B11 is an output of the first primary storage part for B, while A12 is an output of the second primary storage part for A, and B12 is an output of the second primary storage part for B.

FIG. 3 is a timing chart, wherein φ0 is a reference clock, and STT is a focusing initiation signal, while φL is a light projection control signal to control a flickering of a projection light source, and RS is a reset signal for an initial setting of the position detecting sensor 33, then BSY is a signal to indicate that the position detecting sensor 33 is in operation. What are shown as φ1 to φ4 are first to fourth gate signals, and F is a signal to indicate that an output A of the sensor for A or an output B of the sensor for B has exceeded a certain level Vref, while STP is a position detecting completion signal.

Then, PID represents a period during which the BSY is at "0" level, that is a period during which the position detecting sensor 33 does not function, in other words a stand-by period, and PRS indicates an initial setting period for the position detecting sensor, while PS1 to PS2n show respectively first to 2n-th cycles of light projection, and PJG is a period during which it is judged that an output of the position detecting sensor is set. What is shown as K is a number of light projections in each light projection cycle.

FIG. 4 shows an embodiment of timing pulse generation means, wherein 201 is a reference clock generator, 202 is a register, 203 is a counter, 204 to 206 are D-flip-flops, 207 is an RS flip-flop, 208 is a shift register, 209 is a NOR gate, 210 is an exclusive OR gate, 211 is an inverter, 212 is an AND gate, 213 is a 3-inputs AND gate, 214 is a 3-inputs NAND gate, and 215 is a NAND gate. The counter 203 is a synchronizing counter like SN74161 of TI (Texas Instruments) as an example, wherein α1, α2, α3 and α4 are input terminals for presetting and are to be loaded by a rising of φ0 at a time a load signal "Load" is at "L" level, while RC is a ripple carry and becomes "H" when the counter counts 15. Also Din in the shift register 208 is a data input terminal, and D0, D1 are first stage and second stage output terminals of the register. The register is also to have an input and a shifting at a rising of φ0. Also, a data input terminal of the D-flip-flop 204 is shown by D, wherein Q output is represented by Q and $\overline{Q}$ output is represented by $\overline{Q}$. Data input of the D-flip-flop is made at a rising of clock pulse. Outputs, $\overline{K1}$, $\overline{K2}$, $\overline{K3}$, $\overline{K4}$ of the register 202 are signals for binary signals, K1, K2, K3, K4 being respectively inverted, and the register 202 is the one having $\overline{Q}$ output like SN74175 of TI (Texas Instruments) as an example. For example, when K is represented by K=3, a value loaded at the counter 203 becomes 12 and light projection pulses are produced three times at each light projection cycle, then as the counter counts 15, Rc becomes "H", and the D-flip-flop 204 is set at a falling of φ0 and $\overline{Q}$ becomes "L" then α1 to α4 will be loaded to the counter with next rising of φ0.

The binary signals K1 to K4 are codes representing numbers of light projections K at each light projection cycle, wherein 4 bit arrangement with LSB of K1 and MSB of K4 is shown for a benefit of simplicity. Bit number of binary signals representing K is not limited to 4 bit and may be any number of bit, wherein step numbers of the register 202 and the counter 203 may be changed depending on a necessary bit number. KSET is a light projection number setting signal to write the signals K1 to K4 in the register 202, and is sent as required from the system control means 36 together with the binary signals K1 to K4.

In the timing chart of FIG. 3, K is set as K=3 and a number of light projections in one light projection cycle is set as 3.

Next, operations in FIG. 1 to FIG. 4 will be explained.

When a position of the radiant Qs projected on an object is to be detected by the position detecting sensor, light coming from ambient light will be projected on a light receiving plane of the sensor overlapping the image Qp of the radiant image Qs by the light projection means. An element for the image Qp for Qs is called as a projected light element and other light (ambient light) is called as an external light element, and projected light elements sensed at light sensing parts A and B during a light projection with a certain light projection cycle are represented by AL and BL, then external light elements of A and B are shown as Aob and Bob, amounts of light AL+ob and BL+ob during the period of light projection sensed at the light sensing parts A and B will be represented respectively by $$AL+ob=AL+Aob \quad (1)$$

$$BL+ob=BL+Bob \quad (2).$$

In order to eliminate unnecessary external light element other than the reflected light element by the projection from the light projection means in a position detecting, Aob and Bob may be subtracted from AL+ob and BL+ob at the time of light projection. The external light elements Aob and Bob are predicted by amounts of light A′ob and B′ob sensed at each sensor at a time no light projection is made. Since the external light elements have ordinarily time-wise variations, in order to reduce an influence thereof, light projections and no light projections are repeated for several times during each light projection cycle, thus the AL and BL at each light projection cycle are predicted with mean value of the several repeated projection - non-projection.

When $\phi 1$ is "H", the first gate g1a (g1b) is opened, and when $\phi 1$ is "L", the first gate g1a (g1b) is closed, while the second gate g2a (g2b) is opened when $\phi 2$ is "H", and the second gate g2a (g2b) is closed when $\phi 2$ is "L". At a time of light projection (when $\phi L$="H") in the first light projection cycle, $\phi 1$ is "H" and $\phi 2$ is "L", and at this time the charge generated at the sensing part 100a (100b) is stored at the first primary storage part 101a (101b). Contrary thereto, when $\phi 1$ is "L" and $\phi 2$ is "H", no light projection is made, then the charge generated at the sensing part 100a (100b) is stored at the second primary storage part 102a (102b). Therefore, A11, A12, B11 and B12 at the first light projection cycle are to be represented by $$A11=AL+ob=AL+Aob$$

$$A12=A'ob$$

$$B11=BL+ob=BL+ob$$

$$B12=B'ob,$$

theoretically speaking. But since offset elements will overlap each other at the time when the charge is transferred to each storage part, etc., when each offset element is represented by A11o, A12o, B11o and B12o, the above equations will be modified respectively to:

$$A11(1)=AL+ob(1)+A11o=AL(1)+Aob(1)+A11o$$

$$A12(1)=Aob'(1)+A12o$$

$$B11(1)=BL+ob(1)+B11o=BL(1)+Bob(1)+B11o$$

$$B12(1)=Bob'(1)+B12o,$$

wherein (n) represents a value at the n-th light projection cycle. For example, A11(n) represents an amount of charge stored at the first primary storage part 101a at the n-th light projection cycle. When the following equations $$Aob(1)\simeq Aob'(1)$$

$$Bob(1)\simeq Bob'(1),$$

AL(1) and BL(1) can be calculated from A11(1), A12(1), B11(1) and B12(1), but offset elements are left over. If the equations, $$Aob(1)=Aob'(1)+An(1)$$

$$Bob(1)=Bob'(1)+Bn(1)$$

are applied, An(1) and Bn(1) are very minute values in many instances and can be regarded as noise with zero average.

Since $\phi 1$ and $\phi 2$ have their phase inverted against $\phi L$ at the second light projection cycle, the primary storage part at the time of light projection and the primary storage part at the time of no light projection change with each other as compared to the case of the first light projection cycle. Therefore the relationship will be represented by the following equations:

$$A11(2)=Aob'(2)+A11o$$

$$A12(2)=ob(2)+A12o=AL(2)+Aob(2)+A12o$$

$$B11(2)=Bob'(2)+B11o$$

$$B12(2)=BL+ob(2)+B12o=BL(2)+Bob(2)+B12o$$

Also, the following equations will be satisfied:

$$Aob(2)=Aob'(2)+An(2)$$

$$Bob(2)=Bob'(2)+Bn(2).$$

At an odd number cycle of light projection the phase relationship among $\phi 1$, $\phi 2$ and $\phi L$ is same as that at the time of the first light projection cycle and at an even number cycle of light projection the phase relationship among 2, $\phi 1$ and $\phi L$ is same as that at a time of the second light projection cycle, therefore an amount of charge stored at the primary storage part will be represented by the following:

$$\begin{aligned}A11(2n-1) &= AL + ob(2n-1) + A11o \\ &= AL(2n-1) + Aob(2n-1) + A11o \\ A12(2n-1) &= Aob'(2n-1) + A12o \\ B11(2n-1) &= BL + ob(2n-1) + B11o \\ &= BL(2n-1) + Bob(2n-1) + B11o \\ B12(2n-1) &= Bob'(2n-1) + B12o \\ A11(2n) &= Aob'(2n) + A11o \\ A12(2n) &= AL + ob(2n) + A12o = AL(2n) + Aob(2n) + A12o \\ B11(2n) &= Bob'(2n) + B11o \\ B12(2n) &= BL + ob(2n) + B12o = BL(2n) + Bob(2n) + B12o \\ Aob(m) &= Aob'(m) + An(m) \\ Bob(m) &= Bob'(m) + Bn(m)\end{aligned}$$

Next, explanations will be made on a charge transfer from the primary storage part to the secondary storage part. The charge transfer from the primary storage part to the secondary storage part is made by the gate signals $\phi 3$ and $\phi 4$. The charge transfer at an odd number cycle of light projection is made as transferring the charge of the first primary storage part 101a (101b) to the first secondary storage part 103a (103b) by $\phi 3$ using the third gate g3a (g3b) and the 6th gate g6a (g6b) and transferring the charge of the second primary storage part 102a (102b) to the second secondary storage part 104a (104b). Contrary to this, the charge transfer at an even number cycle is made by φ4 using the 4th gate g4a (g4b) and the 5th gate g5a (g5b) transferring the charge of the first primary storage part 101a (101b) to the second secondary storage part 104a (104b) and transferring the charge of the second primary storage part 102a (102b) to the first secondary storage part 103a (103b). After repeating an times of light projection cycles, each signal stored at the secondary storage parts will be represented by the following.

That is, when the following equations are applied:

$$A1(2N) = \sum_{n=1}^{N} \{A11(2n-1) + A12(2n)\}$$

$$A2(2N) = \sum_{n=1}^{N} \{A11(2n) + A12(2n-1)\}$$

$$B1(2N) = \sum_{n=1}^{N} \{B11(2n-1) + B12(2n)\}$$

$$B2(2N) = \sum_{n=1}^{N} \{B11(2n) + B12(2n-1)\}$$

and the equations for the amount of charge stored at the primary storage parts described previously are used, the signal will be represented by:

$$A1(2N) = \sum_{n=1}^{2N} AL(n) + \sum_{n=1}^{2N} Aob(n) + NA11o + NA12o$$

$$A2(2N) = \sum_{n=1}^{2N} Aob'(n) + NA11o + NA12o$$

$$B1(2N) = \sum_{n=1}^{2N} BL(n) + \sum_{n=1}^{2N} Bob(n) + NB11o + NB12o$$

$$B2(2N) = \sum_{n=1}^{2N} Bob'(n) + NB11o + NB12o.$$

Outputs A and B of the differential amplifiers 105a and 105b of A and B are represented by:

$$A = A1 - A2$$

$$B = B1 - B2,$$

therefore the following equations are satisfied:

$$A(2N) = \sum_{n=1}^{2N} AL(n) + \sum_{n=1}^{2N} An(n)$$

$$B(2N) = \sum_{n=1}^{2N} BL(n) + \sum_{n=1}^{2N} Bn(n),$$

wherein the offsets, A11o, A12o, B11o and B12o are not included in the signals of A(2N) and B(2N), indicating that these offsets have been eliminated.

Since $$\sum_{n=1}^{2N} An(n) \text{ and } \sum_{n=1}^{2N} Bn(n)$$

can be regarded as sums of minute noise with mean value of zero, even if N becomes large they will not be increased, thus can be disregarded compared to $$\sum_{n=1}^{2N} AL(n) \text{ and } \sum_{n=1}^{2N} BL(n).$$

From this, the A(2N) and B(2N) may be regarded as sums of projected light elements at N times light projection cycles, respectively.

FIG. 5 shows a modification of the embodiment shown in FIG. 2 (wherein components having same functions as those shown in FIG. 2 are represented by same identification numbers and marks as in FIG. 2, and 110a is a differential amplifier of A, while 110b is a differential amplifier of B, then each output of each differential output is represented by $$Ad1 = A11 - A12 + Ab1$$

$$Ad2 = A12 - A11 + Ab2$$

$$Bd1 = B11 - B12 + Bb1$$

$$Bd2 = B12 - B11 + Bb2$$

wherein Ab1 represents an offset of a first output Ad1 of the differential amplifier of A, and Ab2 represents an offset of a second output Ad2 of the differential amplifier of A, while Bb1 represents an offset of a first output Bd1 of the differential amplifier of B, and Bb2 represents an offset of a second output Bd2 of the differential amplifier of B.

A1(2N) is represented by:

$$A1(2N) = \sum_{n=1}^{N} Ad1(2n-1) + \sum_{n=1}^{N} Ad2(2n)$$

$$= \sum_{n=1}^{N} \{A11(2n-1) - A12(2n-1)\} +$$

$$\sum_{n=1}^{N} \{A12(2n) - A11(2n)\} + NAb1 + NAb2$$

A2(2N) is represented by:

$$A2(2N) = \sum_{n=1}^{N} Ad1(2n) + \sum_{n=1}^{N} Ad2(2n-1)$$

$$= -\sum_{n=1}^{N} \{A11(2n-1) - A12(2n-1)\} -$$

$$\sum_{n=1}^{N} \{A12(2n) - A11(2n)\} + NAb1 + NAb2$$

B1 and B2 will be represented in a similar manner, thus these may be consilidatedly represented by:

$$A1(2N) = \sum_{n=1}^{2N} AL(n) + \sum_{n=1}^{2N} An(n) + NAb1 + NAb2$$

$$A2(2N) = -\sum_{n=1}^{2N} AL(n) - \sum_{n=1}^{2N} An(n) + NAb1 + NAb2$$

$$B1(2N) = \sum_{n=1}^{2N} BL(n) + \sum_{n=1}^{2N} Bn(n) + NBb1 + NBb2$$

$$B2(2N) = -\sum_{n=1}^{2N} BL(n) - \sum_{n=1}^{2N} Bn(n) + NBb1 + NBb2$$

Therefore, A(2N) and B(2N) will be represented by:

$$A(2N) = A1(2N) - A2(2N)$$

$$= 2 \sum_{n=1}^{2N} AL(n) + 2 \sum_{n=1}^{2N} An(n)$$

$$B(2N) = B1(2N) - B2(2N)$$

$$= 2 \sum_{n=1}^{2N} BL(n) + 2 \sum_{n=1}^{2N} Bn(n)$$

Thus indicating that offsetting elements of A11o, A12o, B11o, B12o, Ab1, Ab2, Bb1 and Bb2 have been eliminated. When such system is employed, the signals stored at the secondary storage part have external light elements eliminated therefrom to some extent, thus the signals are small ones compared to those shown in the embodiment of FIG. 2, preventing the secondary storage part from being saturated with external light elements.

As has been explained above, offsetting elements at the primary storage part can be eliminated by exchanging the primary storage part at the time of light projection with that at the time of no light projection for each light projection cycle and exchanging the signals again in a course of sending signals from the primary storage part to the secondary storage part. In order to achieve the object of the present invention more efficiently, it is desirable to repeat the light projection cycles for even number of times. And the light projection cycle is preferably completed at the time when the signal A or B exceeds a certain level Vref, or at the time when the light projection cycles are made for a certain number of times.

Also in FIG. 4, the counter 203 is a synchronizing counter such as SN74161 of TI for example, wherein $\alpha 1$, $\alpha 2$, $\alpha 3$ and $\alpha 4$ are input terminals for presetting and are to be loaded at a rising of $\phi 0$ when the load signal "Load" is at "L" level. RC is a ripple carry and becomes "H" when the counter counts 15. Also, Din in the shift register 208 is a data input terminal, and D0 and D1 are output terminals of the registers at the first stage and the second stage. The shift register is also to have an input and a shifting at a rising of $\phi 0$. Also, a data input terminal of the D-flip-flop 204 is represented by D, and Q output is represented by Q, while $\overline{Q}$ output is represented by $\overline{Q}$. An input of the data is done at a rising of clock pulses.

The outputs, $\overline{K1}$, $\overline{K2}$, $\overline{K3}$ and $\overline{K4}$ of the register 202 are signals for having K1, K2, K3 and K4 inverted, and the register 202 is the one having a $\overline{Q}$ output such as SN74175 of TI as an example. For example, when K is set as K=3, the value loaded to the counter 203 will be 12, and light projection pulses are produced three times at each light projection cycle, then as the counter counts 15 RC becomes "H" and the D-flip-flop 204 is set at a falling of $\phi 0$, then the $\overline{Q}$ becomes "L", and the $\alpha 1$ to $\alpha 4$ will be loaded to the counter at a next rising of $\phi 0$.

What we claim:

1. A photo-electric conversion element comprising:
light emitting means for continuously repeating light emission;
a photo-electric conversion part for receiving light generated by said light emitting means and light reflected from ambient light;
a first storage part for storing information which has been photo-electrically converted at the photo-electric conversion part when the light emitting means emits light;
a second storage part for storing information which has been photo-electrically converted at the photo-electric conversion part when the light emitting means does not emit light;
a gate part for transferring the information which has been photo-electrically converted at the photo-electric conversion part to the first and second storage parts; and
means for generating pulses which control an operation of the gate part, said pulse generating means producing pulses to control an opening and closing of the gate part for changing over the transfer of the photo-electrically converted information from the photo-electric conversion part at a time of light emission to the first storage part and to the second storage part for every light emitting cycle of the light emitting means.

2. A photo-electric conversion element according to claim 1, further comprising:
a third storage part for storing information concerning light emitted by light emitting means and photo-electrically converted by the said photo-electric conversion part at the time of light emission by the light emitting means as well as information concerning light from reflection of ambient light;
a fourth storage part for storing the information concerning light from reflection of ambient light which has been photo-electrically converted by said photo-electric conversion part when the light emitting means does not emit light; and
computing means for detecting the difference of signals respectively stored at said third and fourth storage parts and computing the same.

3. A photo-electric conversion device comprising:
light emitting means for continuously repeating light emission;
first and second photo-electric conversion parts for receiving light emitted by said light emitting means and light reflected from ambient light;
first primary storage means for storing photo-electrically converted information from the first and second photo-electric conversion parts at a time of a first light emitting cycle of the light emitting means;
first secondary storage part for storing information from each one of the first primary storage means respectively;
secondary primary storage part for storing photo-electrically converted information from the first and second photo-electric conversion parts respectively when no light emission occurs in a first light emitting cycle of the light emitting means;
second secondary storage part for storing information from each one of the second primary storage part respectively;
a gate part or parts, for transferring information respectively from each one of the photo-electric conversion part to each one of the first primary storage part and from each one of the first primary storage parts to the second secondary storage part;
means for generating pulses to control opening and closing of the gate means; and
computing means for detecting the difference between the signal stored at said first primary storage means which has stored information from the first and second photo-electric conversion parts at a time of a first light emitting cycle of the light emitting means and the signal stored in said second secondary storage means which has stored information from the first and second photo-electric conversion parts respectively when no light emission occurs in a first light emitting cycle of the light emitting means.

4. A photo-electric conversion device according to claim 3, wherein said pulse generating means generates first pulses to control the gate means in a way that the photoelectrically converted information from the first photoelectric conversion means is stored at the second storage means at a time of light emission in a second light emitting cycle of the light emitting means.

5. A photo-electric conversion device according to claim 4, wherein said pulse generating means generates second pulses to transfer information of the first primary storage means to the first secondary storage means and information of the second primary storage means to the second secondary storage means at odd number light emitting cycles by the light emitting means, and generates third pulses to transfer the information of the first primary storage means to the second secondary storage means and the information of the second primary storage means to the first secondary storage means respectively at a time of an even number light emitting cycles.

* * * * *